United States Patent [19]
DeMaio

[11] 3,986,002
[45] Oct. 12, 1976

[54] HAND-HOLDABLE LASER SYSTEM COMPUTER

[76] Inventor: Dorian A. DeMaio, 813 S. Catalina Ave., Apt. C, Redondo Beach, Calif. 90277

[22] Filed: May 12, 1975

[21] Appl. No.: 576,486

[52] U.S. Cl. .............................. 235/78 R; 235/88 R
[51] Int. Cl.² ......................................... G06C 27/00
[58] Field of Search ................... 235/77, 78, 84, 88, 235/116

[56] References Cited
UNITED STATES PATENTS

| | | | |
|---|---|---|---|
| 2,934,264 | 4/1960 | Miller | 235/88 |
| 3,243,110 | 3/1966 | Kaser | 235/78 |
| 3,253,780 | 5/1966 | Stewart | 235/88 |
| 3,610,520 | 10/1971 | Connell | 235/78 |
| 3,698,630 | 10/1972 | Dick et al. | 235/84 |
| 3,700,162 | 10/1972 | Gaggero et al. | 235/78 R |

*Primary Examiner*—L. T. Hix
*Assistant Examiner*—Vit W. Miska
*Attorney, Agent, or Firm*—Joseph E. Rusz; Arsen Tashjian

[57] ABSTRACT

A laser system computer in the preferred form of a hand-holdable, two-sided circular slide rule, for quickly and accurately solving a wide range of problems which are associated with laser radar, designation, communications and directed energy applications, the solution of which said problems could not be attained with prior art slide rules of any type. Calculations relating to the design, analysis and performance of lasers are performed on one side of the calculator. Atmospheric effects, such as attenuation and turbulence beam spreading, are computed on the other side of the calculator. Both continuous wave and pulsed lasers can be calculated with the use of this unique computer, which also may be used for ground, air and space laser applications. Structurally, the preferred embodiment is in the form of a circular slide rule having: a circular stator (i.e., base) with a front face and a rear face; a plurality of concentric discs (i.e., slides) of varying diameters shorter than that of the stator and in superposed relationship to, and with, each other and the stator, a removable, centrally located pivot connecting the concentric discs to each other and to the stator, whereby the discs are independently rotatable (i.e., revolvable) about and on the pivot; and, a transparent cursor (i.e., indicator) removably attached to, and revolvable around, the pivot and having a hairline (i.e., index line) thereon. In addition to its specialized function, this unique computer is multi-purpose and can be used to perform conventional mathematical calculations.

7 Claims, 12 Drawing Figures

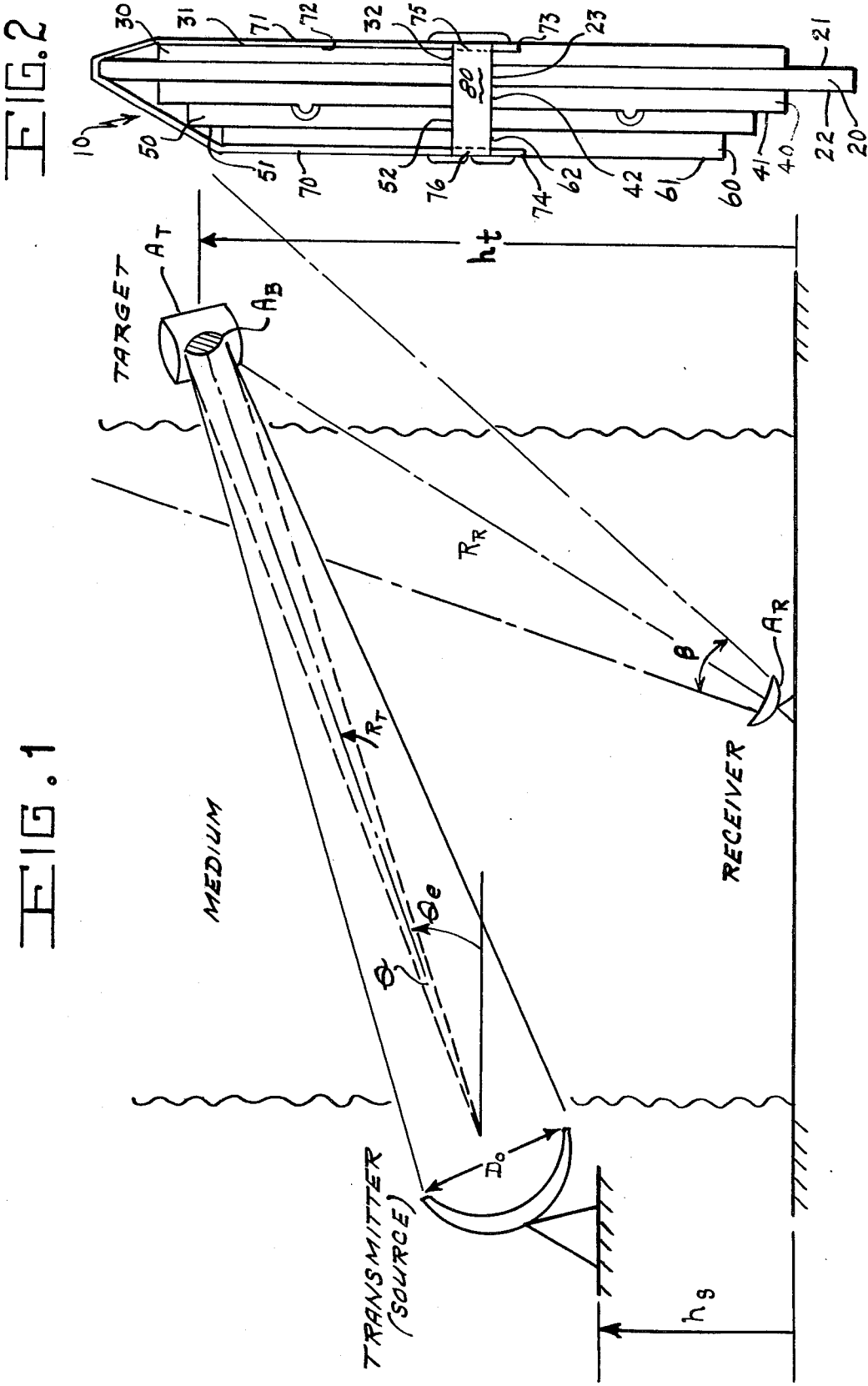

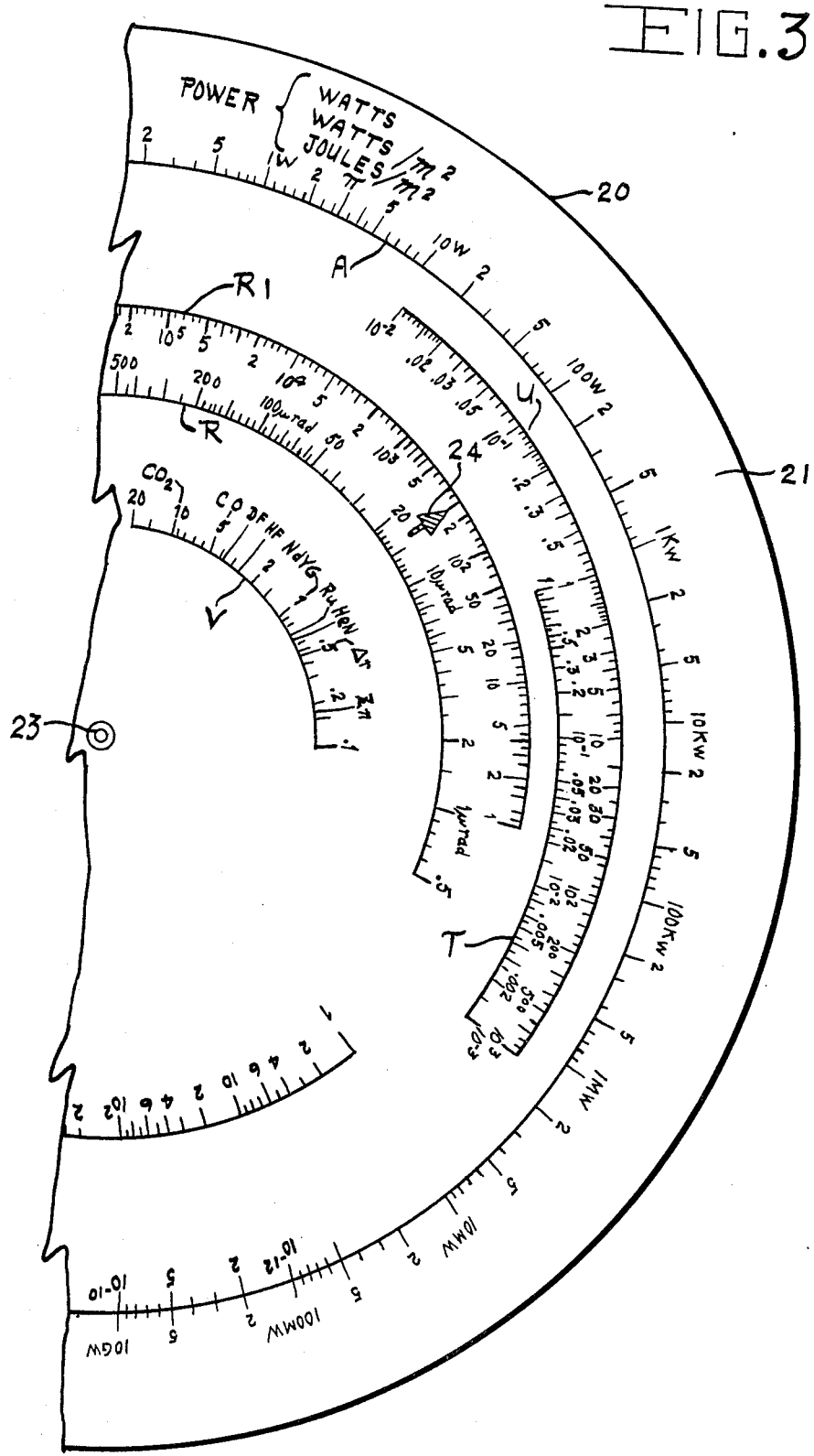

HAND-HOLDABLE LASER SYSTEM COMPUTER

STATEMENT OF GOVERNMENT INTEREST

The invention described herein may be manufactured and used by or for the Government for governmental purposes without the payment of a royalty thereon.

BACKGROUND OF THE INVENTION

This invention relates to a novel laser computer and, more particularly, to one which is hand-holdable and which is in the preferred form of a two-sided circular slide rule.

With the advent of the laser and the development of laser systems, it is desirable and often is necessary to quickly and accurately solve a wide range of problems which are associated with laser radar, designation, communications and directed energy applications, and also to quickly and accurately perform calculations of atmospheric transmission and turbulence-induced spreading of laser beams. Since there is no prior art device which is portable and which can be used to solve these problems, a pressing need for such a device has arisen and continues to exist.

I have invented a unique laser computer which is hand-holdable, which is in the preferred form of a circular slide rule, (to which said structural form scientists, engineers, and technicians can easily relate).

SUMMARY OF THE INVENTION

This invention pertains to a hand-holdable, multipurpose, laser computer in the preferred structural embodiment of a circular slide rule.

Therefore, the principal object of this invention is to teach a laser computer which can be used to quickly and accurately perform a wide range of laser system calculations relating to laser radar, designation, communications and directed energy applications, and similarly to quickly and accurately perform calculations of atmospheric transmission and turbulence induced-spreading of laser beams.

Another object of this invention is to teach the novel laser computer described as the principal objective hereinabove, wherein said computer is, in addition, hand-holdable, multi-purpose, can be used to perform common mathematical calculations of a circular slide rule.

These objects, as well as other related objects, will become readily apparent after a consideration of the description of the invention and reference to the Figures of the drawing.

DESCRIPTION OF THE DRAWINGS

FIG. 1 is a side elevation view, partially in pictorial form and partially in schematic form, which illustrates the typical geometric (and positional) relationships between a laser transmitter, a target, and a receiver;

FIG. 2 is a side elevation view, in cross section, of a preferred embodiment of my inventive laser computer;

FIG. 3B is a top plan view, partially fragmented, of the other portion of the front face of the opaque circular stator member;

DESCRIPTION OF THE PREFERRED EMBODIMENT

Figure 3A:
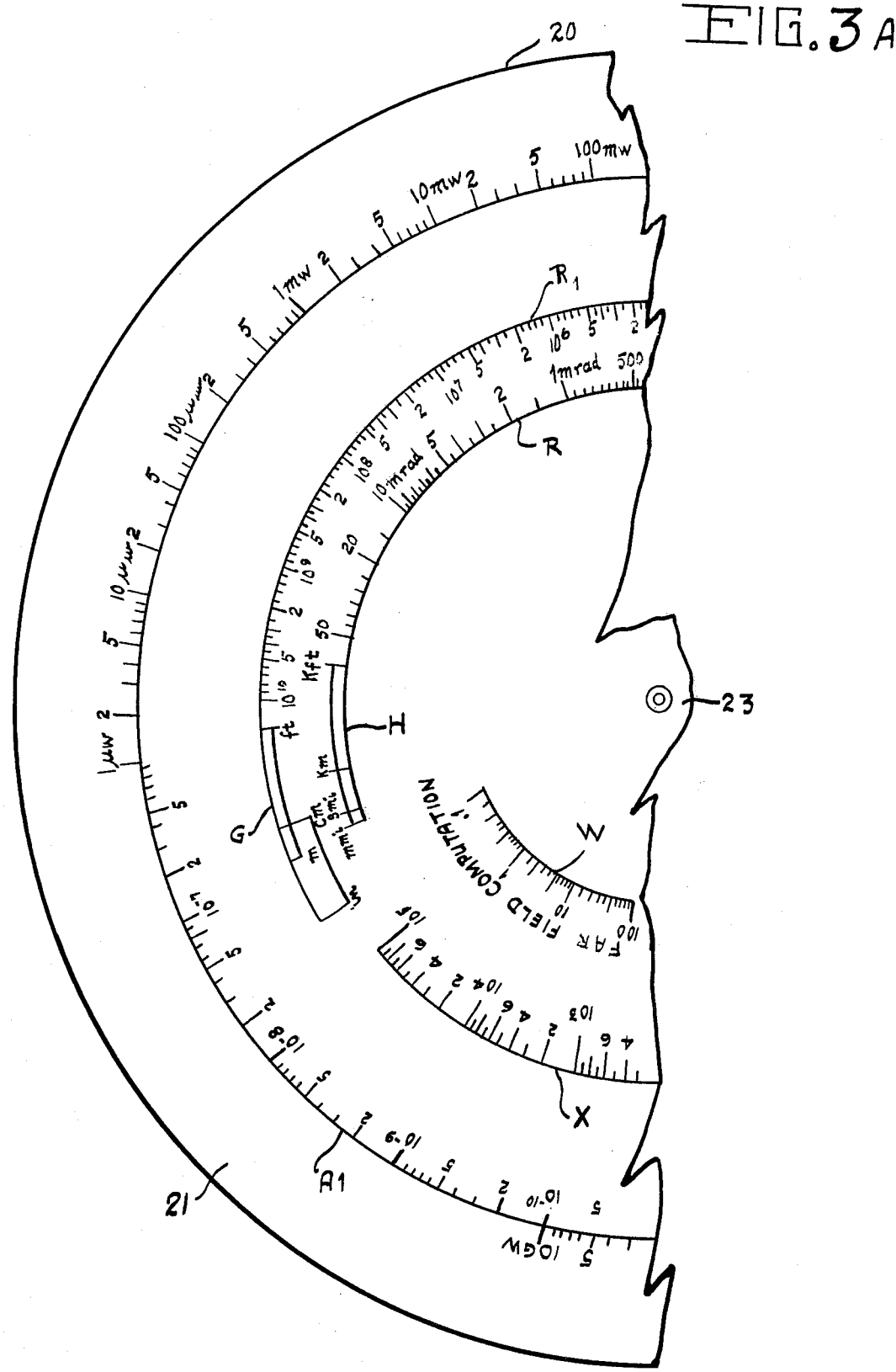
FIG. 3A is a top plan view, partially fragmented, of one portion of the front face of the opaque circular stator member of the same preferred embodiment of my invention which was previously shown in cross section in FIG. 2.

With reference to the drawings, and particularly FIGS. 3A, 3B, 4, 5A, 5B, 6, 7 and 8 thereof, therein are shown component members of a preferred circular slide rule embodiment of my inventive laser computer. It is to be noted and to be remembered that said components are dimensioned and configured to scale, both as to each other and as to the markings (e.g., scales, curves, index markers, and the like thereon and as to the slots, notches, sectors, windows, and the like therein). As a result, the reader need only cut out or reproduce the drawings (one-to-one scale, or uniformly and similarly enlarged or reduced), and assemble the components in their respective and relative positions (as shown in FIG. 2 and as ascertainable from FIGS. 9 and 10) to have a working (i.e. a functional) model or prototype of the preferred embodiment.

In overview, the preferred embodiment 10 is in the form of a hand-holdable, two-sided circular slide rule having: a circular stator (i.e., base) with a front face and a rear face; a plurality of concentric discs (i.e., slides) of varying diameters shorter than that of the stator and in superposed relationship to and with each other and the stator; a removable, centrally located pivot connecting the concentric discs to each other and to the stator, whereby the discs are independently rotatable (i.e., revolvable) about and on the pivot; and, a transparent cursor (i.e., indicator) removably attached to, and revolvable around, the pivot and having a hairline (i.e., index line) thereon.

More specifically, and with reference to FIGS. 2, 3A, 3B, 4, 5A, 5B, 6, 7 and 8, the following is a more detailed description of the independently rotatable concentric discs of varying diameter which, in part, comprise my inventive hand-holdable, two-sided circular slide rule embodiment of my multi-purpose laser system computer:

With reference to FIG. 2, therein is shown (in a side elevation and partially in cross section) a preferred embodiment 10 of my laser computer. The embodiment 10 includes: a circular stator 20 having a front face 21, a rear face 22, a geometric center 23; a first rotor slide disc 30 having a front face 31 and a geometric center 32, and being of a diameter smaller (i.e., shorter) than the diameter of the circular stator 20, with the first rotor slide disc 30 positioned front-face-up on the front face 21 of the stator 20 and with the respective geometric centers 23 and 32 of the stator 20 and of the first rotor disc 30 in registration; a second rotor slide disc 40 having a front face 41 and a geometric center 42, and being of a diameter smaller (i.e., shorter) than the diameter of the circular stator 20, with the second rotor slide disc 40 positioned, on the rear face 22 of the circular stator 20, front-face-up (i.e., back-to-back) and with the respective geometric centers 23 and 42 of the stator 20 and of the second rotor disc 40 in registration; a third rotor slide disc 50 having a front face 51 and a geometric center 52, and being of a diameter smaller (i.e., shorter) than the diameter of the second rotor slide disc 40, with the third rotor slide disc 50 positioned, on the front face 41 of the second rotor slide disc 40, front-face-up-and with the respective geometric centers 42 and 52 of the second rotor disc 40 and the third rotor disc 50 in registration; and fourth rotor slide disc 60 having a front face 61 and a geometric center 62, and being of a diameter smaller (ie., shorter) than the diameter of the third rotor slide disc 50, with the fourth rotor slide disc 60 positioned, on the front face 61 of the third rotor slide disc 50, front-face-up and with the respective geometric centers 52 and 62 of the third rotor disc 50 and the fourth rotor disc 60 in registration; a transparent cursor 70 having an inner surface 72, two ends 73 and 74, with a pivot hole (such as 75 and 76) at end, with the cursor 70 "folded" or bent so that the inner surface 72 abuts the front face 31 of the first rotor slide disc 30 and the front face 61 of the fourth rotor slide disc 60, and with the pivot holes 75 and 76 directionally opposed and in registration, respectively, with geometric centers 32 and 62; and, a removable, centrally located pivot so connecting pivot 80 connecting the first rotor slide disc 30, the circular stator 20, the second rotor slide disc 40, the third rotor slide disc 50, the fourth rotor slide disc 60 to each other and together at their respective geometric centers 32, 23, 42, 52 and 62, and with the pivot 80 also connecting the cursor 70 to the circular stator 20 and to the first, second, third and fourth rotor slide disc 30, 40, 50 and 60, with the result that the cursor 70 and the rotor slide discs 30, 40, 50 and 60 are pivotally secured and are independently rotatable about and on pivot 80.

Now, with reference to FIGS. 3A and 3B, therein are shown, in top plan view and to scale (i.e., to actual size), two complementary fragmented portions which together constitute the entire front face 20 of circular stator 20 of preferred embodiment 10, previously shown in FIG. 2. The stator 20 is opaque; has the geometric center (and hole thereat) 23; and, has a diameter, since it is circular, which is not specifically referenced on the drawings, to prevent confusion and to maintain simplicity of the drawings to the extent that such is possible. The face 21 of the stator 20 has on it, as can be easily seen, a plurality of different preselected scales suitable disposed in arcuate configuration at predetermined fixed locations thereon. These scales, which are disposed radially, are (from the most radially remote, inward): Scale A; Scale A1; Scale U; Scale T; Scales G, R1 and X; Scales H and R; and Scales V and W. Also shown in index marker 24 which is interposed between Scales R and R1.

Figure 4:
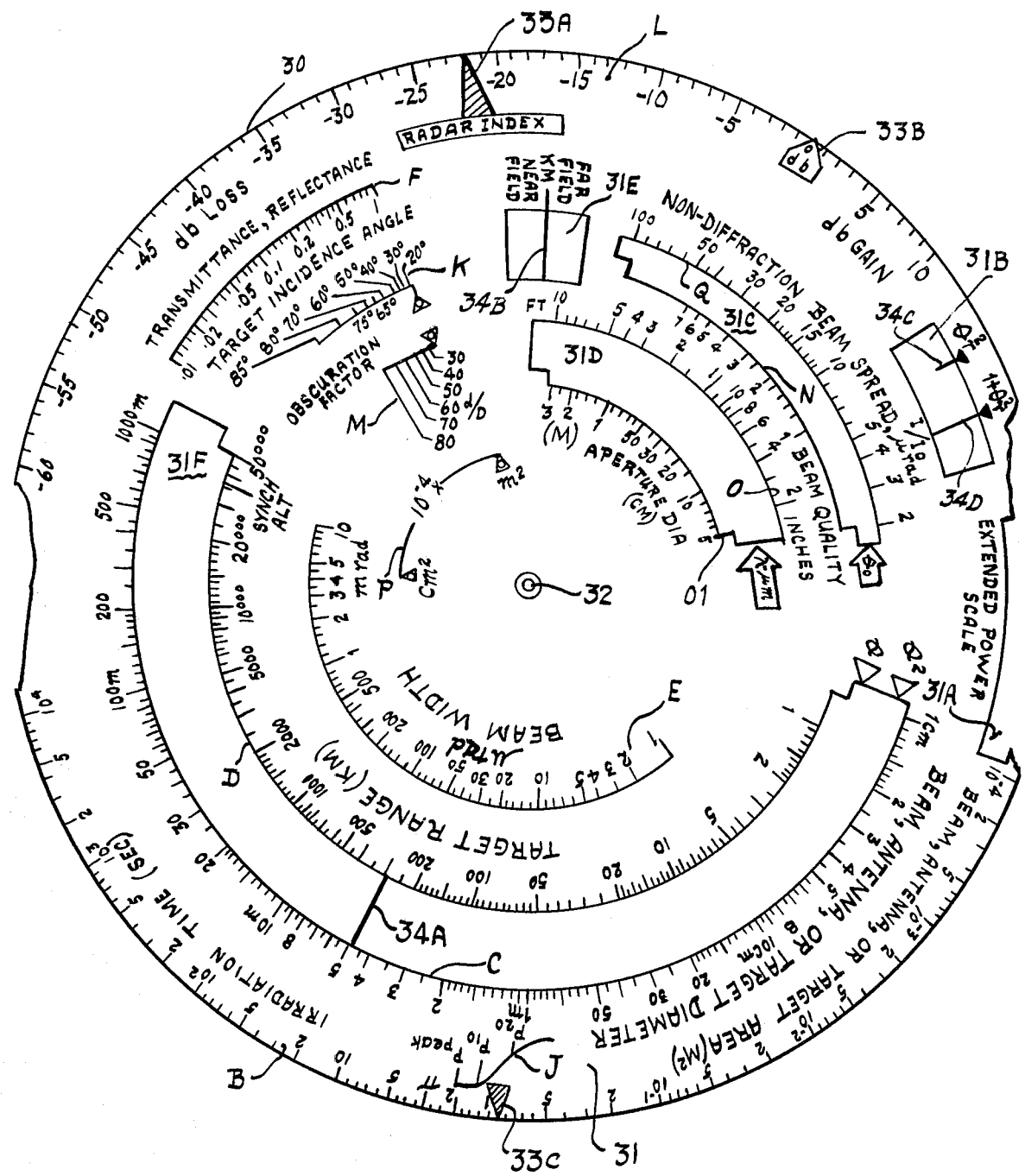
FIG. 4 is a top plan view of the front face of the opaque first rotor slide disc member of the same preferred embodiment of my invention which was shown in FIG. 2.

With reference to FIG. 4, therein is shown, in top plan view and to scale, the front face 31 of first rotor slide disc member 30 of the preferred embodiment 10 of my invention computer, said first rotor slide disc member 30 (hereinafter referred to as the "first rotor") was previously shown, in side elevation view and in its relative positional location, in FIG. 2. First rotor 30 has a geometric center (and a hole thereat) 32, a diameter (not referenced) smaller than the diameter of stator 20, an arcuate configurated notch 31A, a plurality of different arcuate, configurated slots (such as 31B, 31C, 31D, 31E and 31F, and a plurality of different arcuate configurated preselected scales. These scales, which are disposed radially, are (from the most radially remote, inward to the geometric center 32); Scales B and L; Scale J; Scale F; Scales C and Q; Scales D, K and N; Scales M and O; Scale E; Scale $O_1$; and Scale P. Also shown are index markers 33A, 33B, and 33C, and line indicators or fiduciary markers 34A in window 31F, 34B in window 31E, 34C in window 31B, and 34D also in window 31B. The notch 31A, the slots 31B–31F, and the scales are suitably radially disposed on the front face 31 of the first rotor at predetermined fixed locations, so that they (the notch 31A, the slots 31B–31F, and the scales) are useable complementarily with, and cooperatively with, the scales on the front face 21 of the stator 20. The first rotor 30 is opaque, except for the geometric center 32, the notch 31A, and the slots 31B–31F.

Figure 5A:
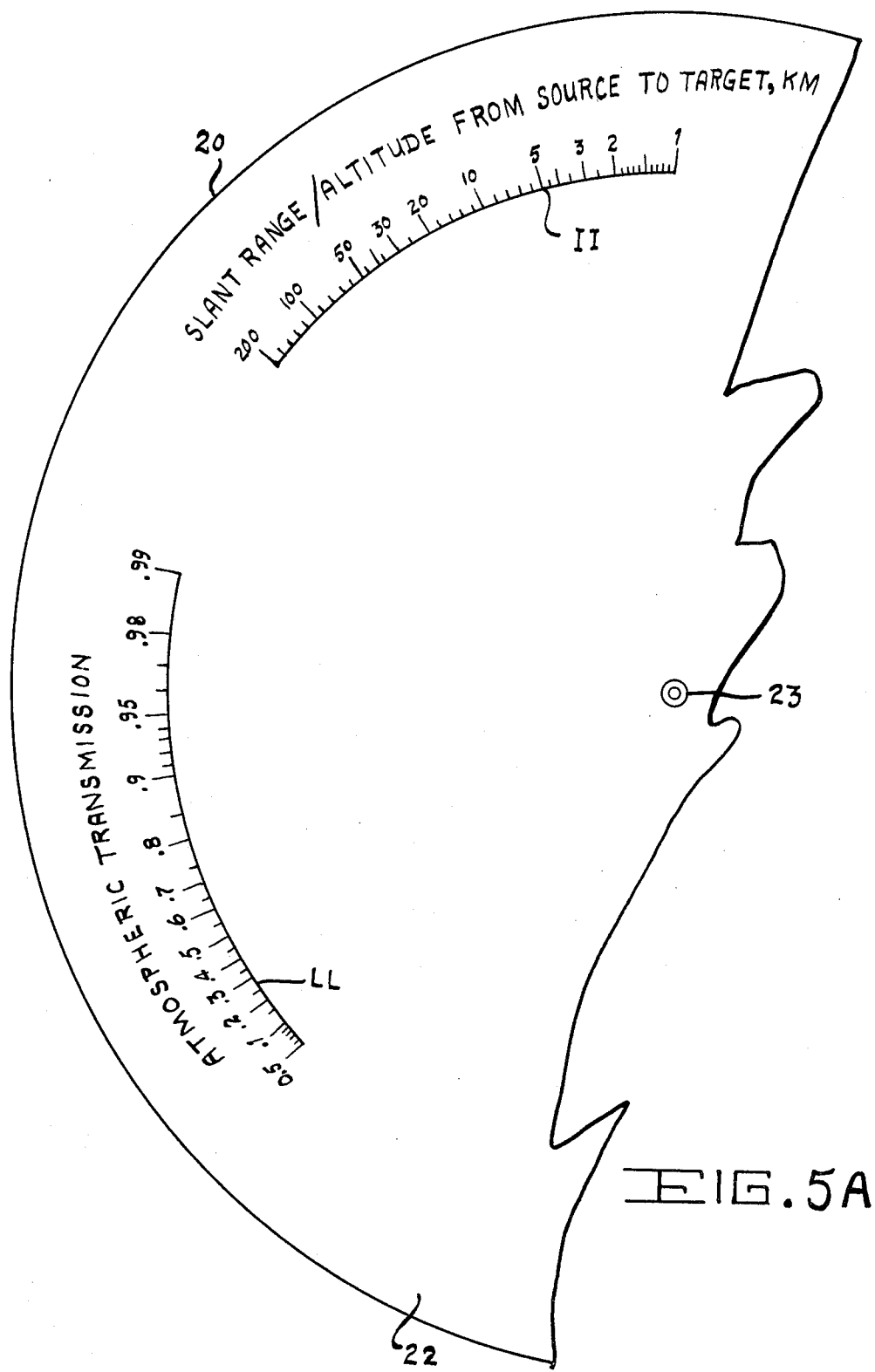
FIG. 5A is a top plan view, partially fragmented, of one portion of the rear face of the opaque circular stator member of the same preferred embodiment previously shown in FIG. 2.
Figure 5B:
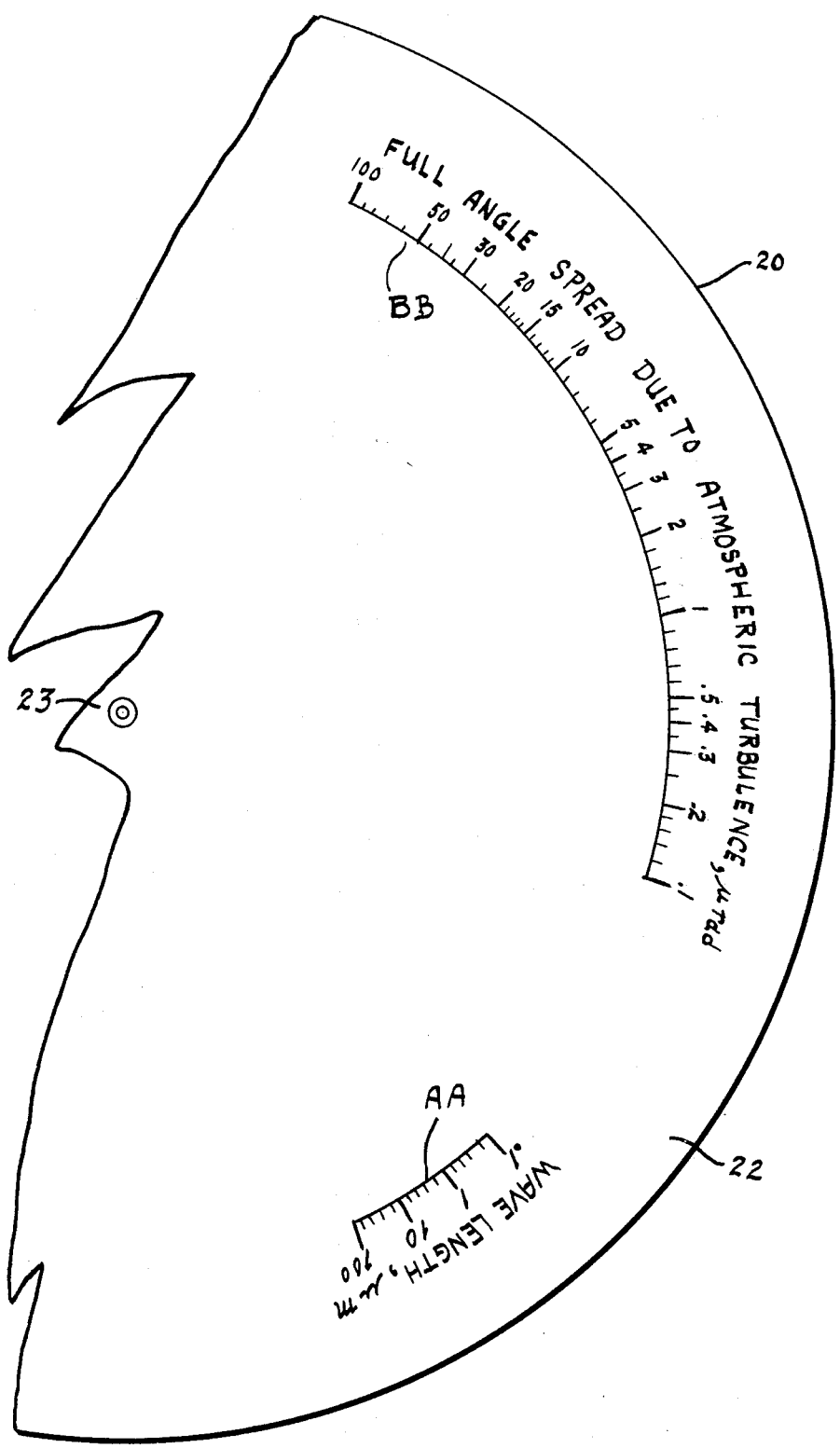
FIG. 5B is a top plan view, partially fragmented, of the other portion of the rear face of the opaque circular stator member of the same preferred embodiment of my invention which was previously shown.

With reference to FIGS. 5A and 5B, therein are shown, in top plan view and to scale, two complementary fragmented portions which together constitute the entire rear face 22 of circular stator 20 of preferred embodiment 10, previously shown in FIG. 2. The stator 20 is, as previously stated, opaque; has the geometric center (and hole thereat) 23; and, has a diameter which is, of course identical as to the front face 21 and the rear face 22, and which said diameter is not referenced for reasons previously stated. The face 22 of stator 20 has a plurality of different preselected scales which are suitably disposed on face 22 radially, in arcuate configuration, and at predetermined fixed locations. These scales are Scales AA, BB, II and LL.

Figure 6:
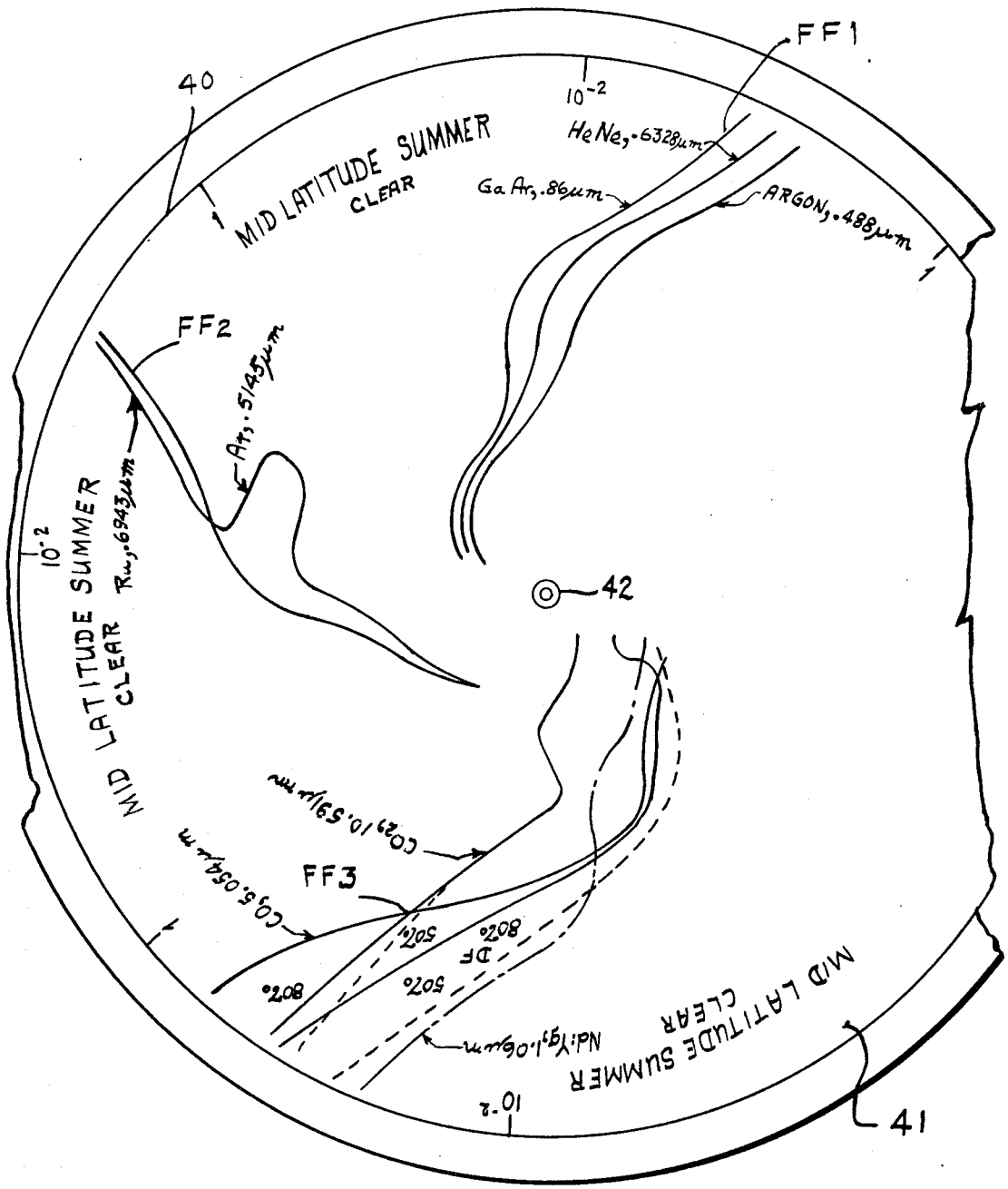
FIG. 6 is a top plan view, partially fragmented, of the front face of the opaque second rotor slide disc member of the preferred embodiment previously shown.

With reference to FIG. 6, therein is shown, in top plan view and to scale, the front face 41 of second rotor slide disc member 40 of the preferred embodiment 10 of my inventive computer. Said second rotor slide disc member 40 (hereinafter referred to as the "second rotor") was previously shown, in side elevation view and in its relative positional location, in FIG. 2. Second rotor 40 has a transparent circumferential section for viewing of scales AA, BB, II and LL on face 22 of stator 20. Second rotor 40 has a geometric center (and hole thereat) 42, a diameter (not referenced) smaller than the diameter of stator 20 (and, of course, of the rear face 22 thereof), and a plurality of different curve-like or graph-like lines (hereinafter referred to as "curves" or "curved scales") which have been preselected and which, in independent groupings, are in fact scales which are neither linear (i.e., not straight) nor arcuate. These curved scales are suitably disposed on front face 41 of second rotor 40 at predetermined fixed locations, so that they are useable complementarily with, and cooperatively with, scales on the rear face 22 of stator 20, and/or on the front faces of third rotor slide disc member 50, FIG. 7, and fourth rotor slide disc member 60, FIG. 8. These surved scales on the front face 41 of second rotor 40 are: Scales FF1, FF2, and FF3.

Figure 7:
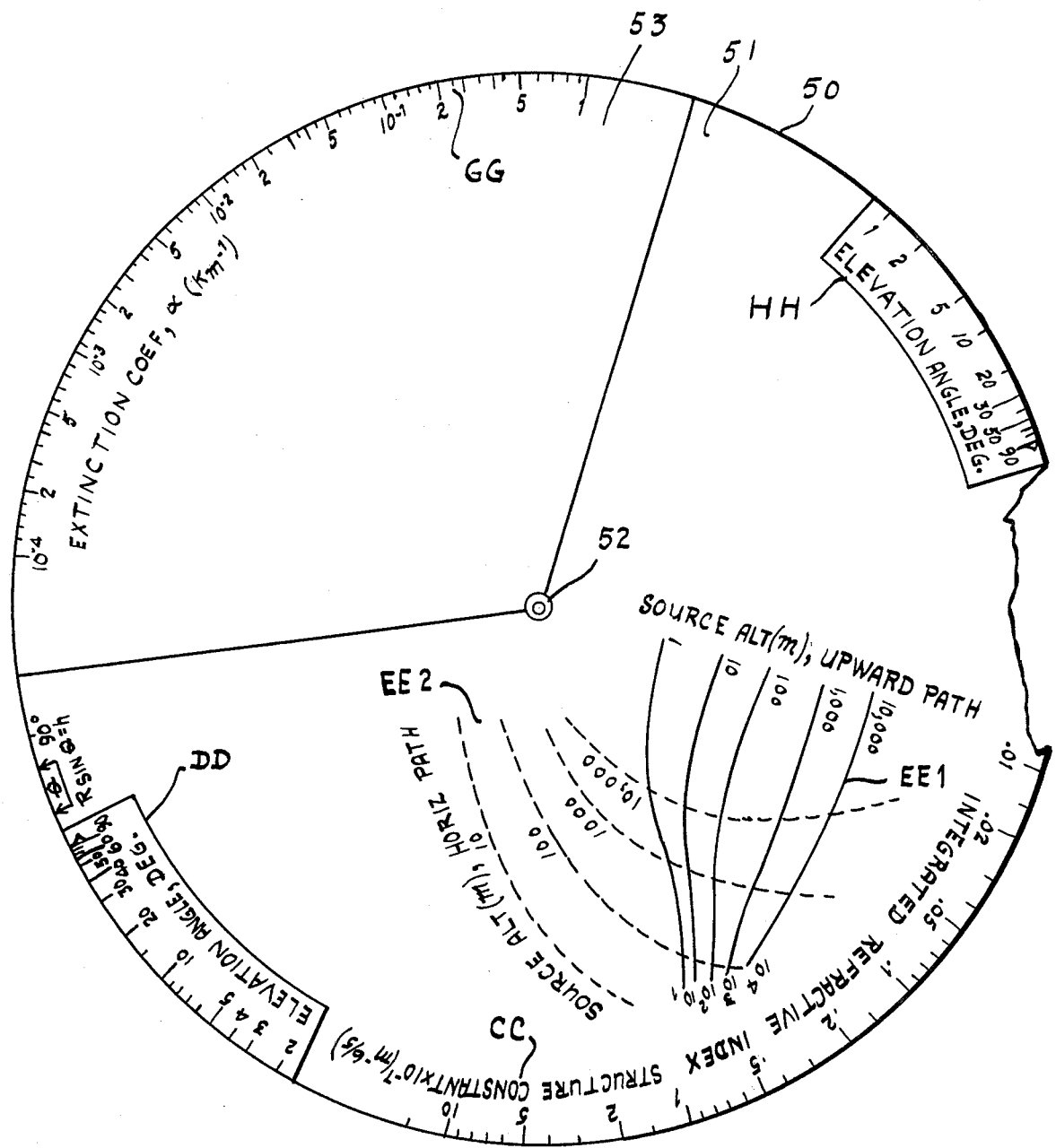
FIG. 7 is a top plan view, partially fragmented, of the front face of the third rotor slide disc member of the preferred embodiment previously shown.

With reference to FIG. 7, therein is shown, in top plan view and to scale, the front face 51 of third rotor slide disc member 50 of the preferred embodiment 10 of my inventive computer. Said third rotor slide disc member 50 (hereinafter referred to as the "third rotor" was previously shown, in side elevation view and in its relative positional location, in FIG. 2. Third rotor 50 has a geometric center (and hold thereat) 52, a diameter (not referenced) which is smaller than the diameter of the second rotor 40 (and, of course, of the front face 41 of second rotor 40), a transparent sector 53 through which may be viewed any one of the plurality of different groupings of scales of curved lines (e.g., Scales FF1, FF2, and FF3) which are disposed on the front face 41 of second rotor 40, and a plurality of different preselected scales, both linear and in independent groupings of curved lines, with all of the scales suitably disposed on the front face 51 of the third rotor 50 at predetermined fixed locations thereon, so that they are useable complementarily with, and cooperatively with, scales on the rear face 22 of stator 20, FIGS. 5A and 5B, and/or on the front faces of second rotor 40, FIGS. 2 and 6, and fourth rotor slide disc member 60, FIG. 8. These scales on the front face 51 of third rotor 50 are: arcuately configured CC, DD, GG and HH; and, curved line group Scales EE1 and EE2.

Figure 8:
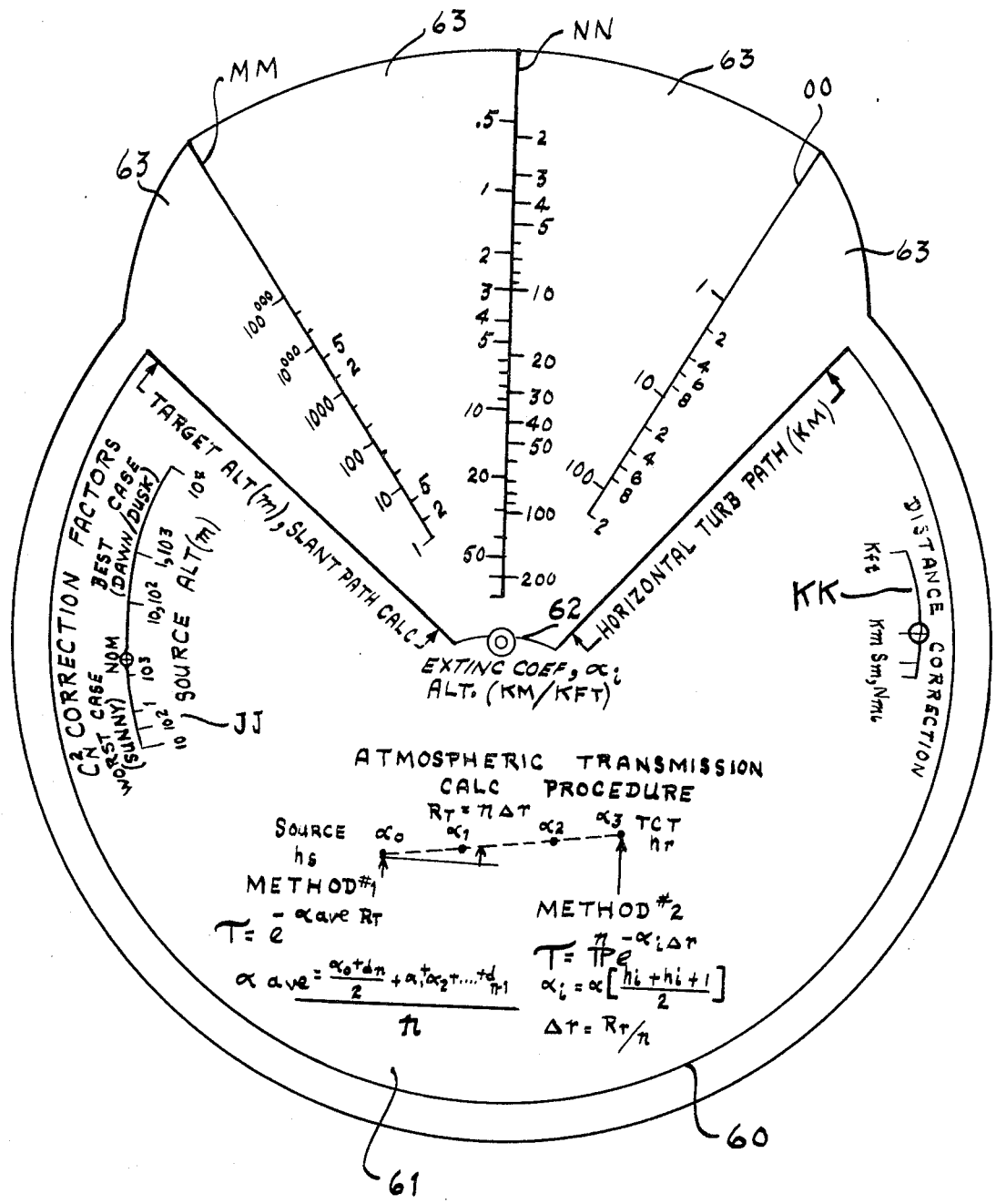
FIG. 8 is a top plan view of the front face of the fourth rotor slide disc member of the preferred embodiment previously shown.

With reference to FIG. 8, therein is shown, in top plan view and to scale, the front face 61 of fourth rotor slide disc member 60 of the preferred embodiment 10 of my inventive computer. Said fourth slide disc member 60 (hereinafter referred to as the "fourth rotor") was previously shown, in side elevation view and in its relative positonal location, in FIG. 2. Fourth rotor 60 has a geometric center (and a hole thereat 62), a diameter (not referenced, but measurable from FIG. 8) that is smaller than the diameter of the third rotor 50 (and, of course, of the front face 51 of third rotor 50), a transparent sector 63 on which are marked and disposed at predetermined fixed locations in radially extending lines a first plurality of different preselected scales and through which said transparent sector 63 may be viewed the scales on second rotor 40 and third rotor 50, and a second plurality of different preselected scales disposed at predetermined fixed locations in arcuate configuration. The first plurality of scales, which said plurality is marked on transparent sector 63 in the form of radially extending lines, comprises Scales MM, NN and OO. The second plurality of scales comprises Scales JJ and KK.

THEORY OF OPERATION OF THE PREFERRED EMBODIMENT

With reference to FIG. 1, therein are shown the typical geometric and positional relationships between a laser transmitter, a target, and a laser receiver sensor. The transmitter is at altitude $h_s$, has an aperture $D_o$, and focuses a laser beam through a medium oer a range $R_T$ to the target which is at altitude $h_t$. The laser receiver sensor has an area of $A_R$; has a field of view B; and, collects energy reflected from the target. The spot size is determined by the beam divergence angle $\theta$. The theoretically smallest divergence angle is achieved with a diffraction limited beam. However, in practice, the beam spread is larger due to non-diffraction operation and jitter from the pointing mount. Turbulence in the atmosphere and, in some cases, thermal blooming will spread the beam. Since the beam spread terms can be modelled by Gaussian distribution statistics, the overall divergence angle can be taken as the square root of the sum of the squares of each angle contributor. In addition to beam spreading there are power losses or "extinctions" which also act to reduce the overall beam intensity in the focal plane. These losses can occur from obscurations and mirror absorption within the beam director, absorption and scattering within the atmosphere, target reflectance, and obliqueness of the beam with the target surface.

MANNER OF OPERATION OF THE PREFERRED EMBODIMENT

Preliminary Matters a. Symbols and Scales to be Used in Describing Manner of Operation:

Performance Parameters:

| Parameter | | Scale |
|---|---|---|
| I | (Incident Intensity watts/m$^2$) | A |
| $I_p$ | (Peak Intensity, watts/m$^2$) | A |
| $I_o$ | (Ideal Flux, watts/m$^2$) | A |
| E | (Incident Energy Fluence, joules/m$^2$) | A |
| $E_{ab}$ | (Total Absorbed Energy, joules) | A |
| t | (Irradiation Time, sec) | B |
| $P_r$ | (Received Power, watts) | A |
| $P_s$ | (Received Sensor Power, watts) | A |
| db | (Decibel Gain or Loss) | L |

| Laser Transmitter Parameters: | | |
|---|---|---|
| Parameter | | Scale |
| $P_L$ | (Laser Power, watts) | A |
| $\lambda$ | (Wavelength, $\mu$m) | W,V,AA |
| $D_o$ | (Aperture Diameter, m) | O,O1 |
| F | (Beam Quality Factor) | N |
| $\sigma_j$ | (One Sigma Jitter, $\mu$rad) | Q |
| d/Do | (Percent Obscuration) | — |
| $K_{OB}$ | (Obscuration Factor) | M |
| $T_{to}$ | (Transmittance of Transmitter Optics) | F |
| $\theta_D$ | (Diffraction Spread Angle, $4\sigma_D$, $\mu$rad) | R |
| $\theta$ | (Total Beam Divergence Angle, $4\sigma$, $\mu$rad) | E,R |

-continued

Propagation and Geometric Parameters:

| Parameter | | |
|---|---|---|
| $R_T$ | (Target Range, km) | D, II |
| $R_R$ | (Return Path Range, km) | D |
| $R_{RR}$ | (Rayleigh Range, km) | X |
| L | (Horizontal Path Length, km) | OO |
| $h_s$ | (Laser Altitude, m) | EE1, EE2 |
| $h_t$ | (Target Altitude, m) | MM |
| $\theta_e$ | (Elevation Angle, deg) | DD, HH |
| $D_B$ | (Beam Diameter; $4\sigma$, $\mu$rad) | C |
| $A_B$ | (Beam Area, m$^2$) | B |
| $K_s$ | (Beam Shape Factor) | J |
| $Ta_t$ | (Atmospheric Transmittance to Target) | LL, F |
| $Ta_r$ | (Atmospheric Transmittance Along Return Path) | LL, F |
| $\alpha(h)$ | (Extinction Coefficient, km$^{-1}$) | GG |
| $C_{n_o}2$ | (Nominal Refractive Index Structure Constant, M$^{2/3}$) | CC |
| $\theta_T$ | (Turbulence Induced Beam Spread, $4\sigma_T$, $\mu$rad) | BB |
| $\theta_i$ | (Spreading Terms other than $\theta_D$, $\mu$rad) | Q |

Target Parameters:

| Parameter | | Scale |
|---|---|---|
| $A_{NT}$ | (Receiver Antenna Area, m$^2$) | B |
| $A_T$ | (Target Area, m$^2$) | B |
| $D_T$ | (Target Diameter, m) | C |
| P | (Target Reflectance) | F |
| $i_a$ | (Beam Incidence Angle, deg) | K |

Receiver Sensor Parameters:

| Parameter | | Scale |
|---|---|---|
| $T_{ro}$ | (Transmittance of Sensor Optics) | F |
| B | (Receiver Field of View, $\mu$rad) | E |
| $A_R$ | (Sensor Area, m$^2$) | B | b. Equations of Some of the Laser Ssytem Problems Solvable with Inventive Computer, Using Front Face 21 of Stator 20 and Front Face 31 of First Stator 30:

1. Incident Intensity
(Assumes Gaussian Input Beam Truncated at 1/e$^2$ points)

$$I = \frac{K_s P_L}{A_B} K_{OR} T_{to} Ta_t \cos i_a = \frac{K_s P_L}{\pi/4 R_T^2 \theta^2 K_{OR} T_{to} Ta_t \cos i_a}$$

2. Intensity Average Factor $$I_p = \frac{P_L}{2\pi R_T^2 \sigma^2} = \frac{0.5 P_L}{\pi R^2 \sigma^2}$$

$$I_{1\sigma} = \frac{0.394 P_L}{\pi R_T^2 \sigma^2}$$

$$I_{2\sigma} = \frac{0.865 P_L}{\pi R^2 (2\sigma)^2} = \frac{216 P_L}{\pi R^2 \sigma^2}$$

| Average | $K_s$ |
|---|---|
| peak, $I_p$ | 2 |
| one sigma, $I_{1\sigma}$ | 1.57 |
| two sigma, $I_{2\sigma}$ | .865 |

3. Incident Energy Density (Fluence)

$$E = I \times t$$

4. Total Absorbed Energy $$E_{ab} = E(1-p) A_T$$

5. Beam Cross Sectional Area $$A_B = \pi/4 \, D_B^2 \, ps$$

6. Beam Diameter $$D_B = R\theta$$

7. Total Beam Spread Angle (Full Angles, 2 (2$\sigma$))

$$\theta = [\theta_D^2 + \theta_J^2 + \theta_T^2]^{1/2}$$

8. Beam Spread Due Diffraction (Full Angle, 2 (2$\sigma_D$)) (Assumes Truncated gaussion at 1/e$^2$ points)

$$\theta_D = 1.8 \, F \, \frac{\lambda}{D_o}$$

9. Beam Spread Due Jitter (Full Angle, 2 (2$\sigma_J$))
$$\theta_J = 2(2\sigma_J)$$

10. Ideal Intensity (Diffraction Limited)

$$I_O = \frac{P_L D_o^2}{F^2 \lambda^2 R_T^2}$$

11. Ideal Intensity Reduction Due Non-Diffraction Spreading Effects $$I/I_O = [1 + \theta_R^2]^{-1}$$

$$\theta_R^2 = \frac{\theta_T^2 + \theta_J^2}{\theta_D^2}$$

12. Decible Gain $$db = 10 \log I_2/I_1$$

13. Rayleigh Range

| | | | |
|---|---|---|---|
| $R_{RR}$ | = | $\pi D_o^2/\lambda$ | |
| $D_B$ | $\approx$ | $D_o$ | $0 < R < R_{RR}$ |
| $D_B$ | = | $\sqrt{2} \, D_o$ | $R = R_{RR}$ |
| $D_B$ | > | $\sqrt{2} \, D_o$ | $R > R_{RR}$ |

14. Power Collected by Receiving Antenna at Target $$P_r = IA_{NT}$$

15. Power received by Laser Designator (Radar) Sensor (Assumes perfectly diffuse target reflection; for laser radar equations, assume transmitter and receiver co-located and replace $R_R$ by $R_T$)

aa. Flood Illumination Case (transmitter beam > target size)

$$P_S = \frac{IA_{T\rho} A_R T_{ar} T_{ra}}{2\pi R_R^2}$$

bb. Spot Illumination Case (transmitter beam < target size)

$$P_S = \frac{P_t K_S K_{oR} T_{to} \cos i_{no} \rho T_{ar} T_{ar} T_{ra} A_R}{2\pi R_R^2}$$

16. Conversion Factors 1 nmi = 1.82 km
1 smi = 1.61 km
1 kft = 0.33 km
1 cm² = $10^{-4}$ m²
1 in = 2.54 cm
1 ft = 0.33 m c. Equations of Some of the Laser System Problems Solvable with the Inventive Computer, Using Rear Face 22 of Stator and/or Front Face 41, 51 and 61 of, Respectively, Second Rotor 40, Third Rotor 50, and Fourth Rotor 60:

1. Beam Spread due to Atmospheric Turbulence (Full) Angle, 2 $(2\sigma_T)$ aa. Slant Transmission Path The model for $\theta_T$, is derived from "A Simplified Propagation Model for Laser System Studies", AFWL TR 72–95 (rev), April 1973, by L. Peckham and R. Davis and is based upon the works of Fried and Yura (i.e., "Limiting Resolution Looking Down Through the Atmosphere", J. Opt. Soc. Am., VOL. 56, No. 10, pp 1380–1384, October 66, by D. L. Fried; "Optical Resolution Through a Randomly Inhomogeneous Medium for Very Long and Very Short Exposures", J. Opt. Soc. Am., Vol. 56, No. 10, pp 1372–1739, October 66 by D. L. Fried; and, "Atmospheric Turbulence Induced Laser Beam Spread", Applied Optics, Vol. 10, No. 12, pp 2771–2773, December 71, by H. T. Yura).

$$\theta_T = \frac{6.12 \, I_{nt}}{\lambda^{1/5} \sin^{3/5}\theta_e}$$

$$I_{nt} = \left[\int_{hs}^{ht} C_{n_o}^2 \left(\frac{h_t - h}{h_t - h_s}\right)^{5/3} dh\right]^{3/5}$$

The reflective index structure constant, $C_{no}^2$ is based upon data from "Calculations of the Effect of Atmospheric Turbulence on the Minimum Spot Angle for a Laser Beam", United Aircraft Research Laboratories Report UAR-J-240-1, December 70.

Nominal Turbulence Model:

$C_{no}^2 = \frac{10^{-13}}{h^{1.075}}$ m$^{-2/3}$   $0 < h < 10^4$ meters
$C_{no}^2 = 2 \cdot 10^{-16}$ m$^{-2/3}$   $10^4 < h < 1.1 \cdot 10^4$ meters
$C_{no}^2 = 0$   $h > 2 \cdot 10^4$ meters Variations from Nominal:

| Altitude (meters) | Best Case (Dawn Dusk) | Worst Case (Sunny) |
|---|---|---|
| 1 | $9 \cdot 10^{-15}$ | $3 \cdot 10^{-13}$ |
| 10 | $3 \cdot 10^{-15}$ | $6 \cdot 10^{-14}$ |
| $10^2$ | $3 \cdot 10^{-16}$ | $4 \cdot 10^{-15}$ |
| $10^3$ | $1 \cdot 10^{-17}$ | $1.4 \cdot 10^{-15}$ |
| $10^4$ | $3 \cdot 10^{-18}$ | $2 \cdot 10^{-16}$ | bb. Horizontal Transmission Path $$\theta_T = \frac{3.4 C_{no}^{6/5} L^{3/5}}{\lambda_{21}^{1/5}}$$

(2). Atmospheric Transmission aa. Method No. 1 - Integral Approximation $$T_a = e^{\alpha_{ave} R_T}$$

$$\alpha_{ave} = \int_{h_s}^{h_t} \frac{\alpha(h) dh}{h_t - h_s}$$

$$= \frac{\sum_{1}^{n} \frac{(\alpha_{i-1} + \alpha_i)}{2} \Delta h}{h_t - h_s} = \frac{\sum_{1}^{n} \frac{(\alpha_{i-1} + \alpha_i)}{2}}{n}$$

$$T_a = e^{\frac{R_T}{n} \left[\frac{\alpha_0 + \alpha_n}{2} + \alpha 1 + \alpha 2 + \ldots + \alpha n - 1\right]}$$

bb. Method No. 2 - Average Altitude $$T_a = \pi_1^n e^{-\alpha_i \Delta r} = (T_{a0})(T_{a1})\ldots(T_{an})$$

$$\alpha i = \alpha \frac{(h_i - 1 + h_i)}{2}$$

$$\Delta r = R_T/n$$

$CO_2$ and DF extinction coefficients were obtained from the above-cited "A Simplified Propagation Model for Laser System Studies" by Perkham and Davis. Extinction coefficients for 0.488 μm, 0.5145 μm, 0.6328 μm, 0.6943 μm, 0.86 μm and 1.06 μm, 3.8 μm, 10.6 μm were obtained from "Optical Properties of the Atmosphere" (Third Edition), AFCRL-72-0497, August 72, by R. A. McClatchey.

3. Altitude Differential $$\Delta H = h_t - h_s = R_T \sin \theta_e$$

d. General Discussion of Manner of Operation of the Inventive Computer:

The primary calculations performed by my inventive computer are a determination of the laser beam intensity, energy density and total power, as a function of known laser transmitter and receiver characteristics, propagation parameters and target characteristics. The governing mathematical equations have been developed for all the applications, and said equations have been set out heretofore.

The ease of operation and the versitility of this invention in solving a large number of problems is attributable to the following key structural features:

1. Through the use of scales positioned to represent the mathematical relationships between the parameters, each pertinent parameter is entered sequentially in a given computation to effect a cumulative result. For instance, to determine flux density, the computation usually begins with laser output power, followed by a series of operations which increases or decreases the effect of each parameter. Conversely, it is possible to find the required laser transmitter design values to achieve a specified performance. Furthermore, it's not necessary to repeat an entire sequence of operations to determine the result at other parameter values. The effect on the overall calculation is found by entering the difference between the old and new parameter values.

2. For simplicity of operation, the scales on the performance side (i.e., front face 21 of stator 20, FIGS. 3A and 3B, and front face 31 of first rotor 30, FIG. 4 of the computer are arranged so that each pertinent parameter is entered in the calculation in a way which resembles the form of the equation. For instance, beam intensity is obtained by dividing the laser power by the area of the beam. This operation is performed in the computer by placing the area value under the power value and reading the result at the index. This feature aids the user in remembering the manipulations required in a given calculation.

3. All of the laser systems applications involve computations of incident or reflected beam intensities and total power contained within all or part of the beam. In order to reduce the number of operator manipulations, the computer is structured to take advantage of the similarity between equations of each application.

4. The inventive computer 10 uses metric units, and assumes certain nominal conditions. Supplemental scales are provided for conversion to nmi, smi and feet units, as well as for entering the effects of beam shape, incidence angle, transmission factors, target reflectance, and mirror obscurations and losses.

SPECIFIC EXAMPLES OF THE OPERATION OF THE PREFERRED EMBODIMENT a. An Illustrative Problem and the Solution 1. Problem: Find the beam spread due to diffraction ($\theta_D$).

Figure 9:
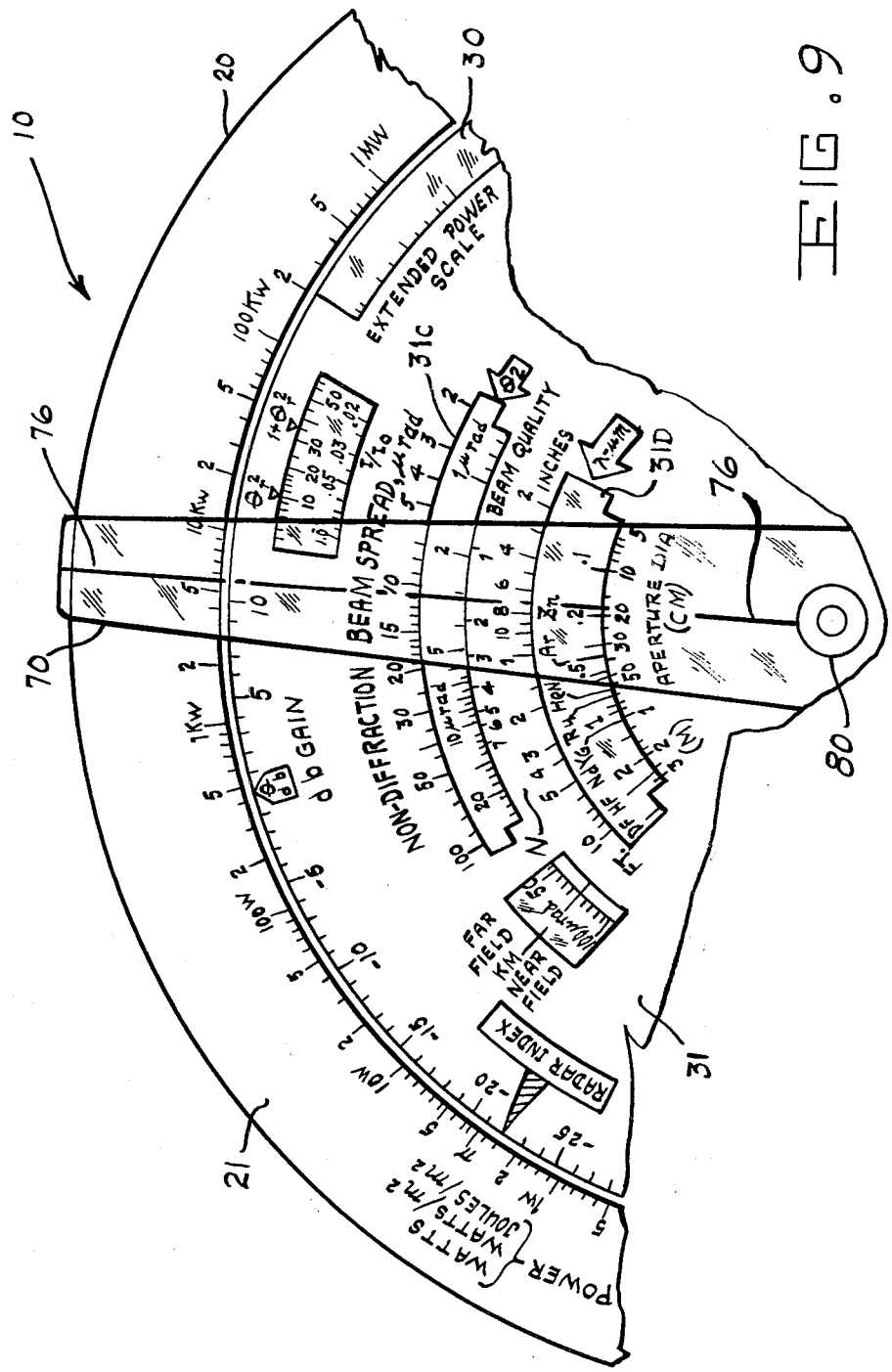
FIG. 9 is a top plan view, partially fragmented, of the front face of the circular stator member and of the first rotor slide disc member and also of the cursor member of the preferred embodiment of my inventive computer in one operative mode thereof for performing a representative particular calculation; and, FIG. 10 is a top plan view, partially fragmented, of the rear face and of the circular stator member, and of the front faces of the second, third and fourth rotor slide discs members, and also of the cursor member of the preferred embodiment of my inventive computer in a second operative mode thereof for performing a second representative particular calculation.

2. Solution: With reference to FIG. 9, therein is shown, in top plan view and in partially fragmented form, a pertinent portion of the preferred embodiment 10 of my inventive computer, with the components thereof in proper positional relationship to solve the above stated beam spread problem. Shown in FIG. 9 in front face 21 of stator 20, front face 31 of first rotor 30, cursor 70 with radially disposed hairline 76 marked thereon, and removable, centrally located connecting pivot 80.

Succinctly, the preferred sequential steps in solving this problem are as follows: Firstly, select the appropriate equation, i.e., $\theta_D = 1.8F \lambda/D_0$, as shown hereinabove. Secondly, in slot or window 31D position the wavelength, $\lambda$, on scale V. Thirdly, set the aperture diameter $D_0$ on scales $O_1$ (or O) under (over) $\lambda$. Fourthly, in slot or window 31C at beam quality factor concerned, read $\theta_D$ (the solution) on scale R (in window 31C).

b. Another Illustrative Problem and the Solution

1. Problem: Find the beam spread from the atmospheric turbulence ($\theta_T$).

Figure 10:
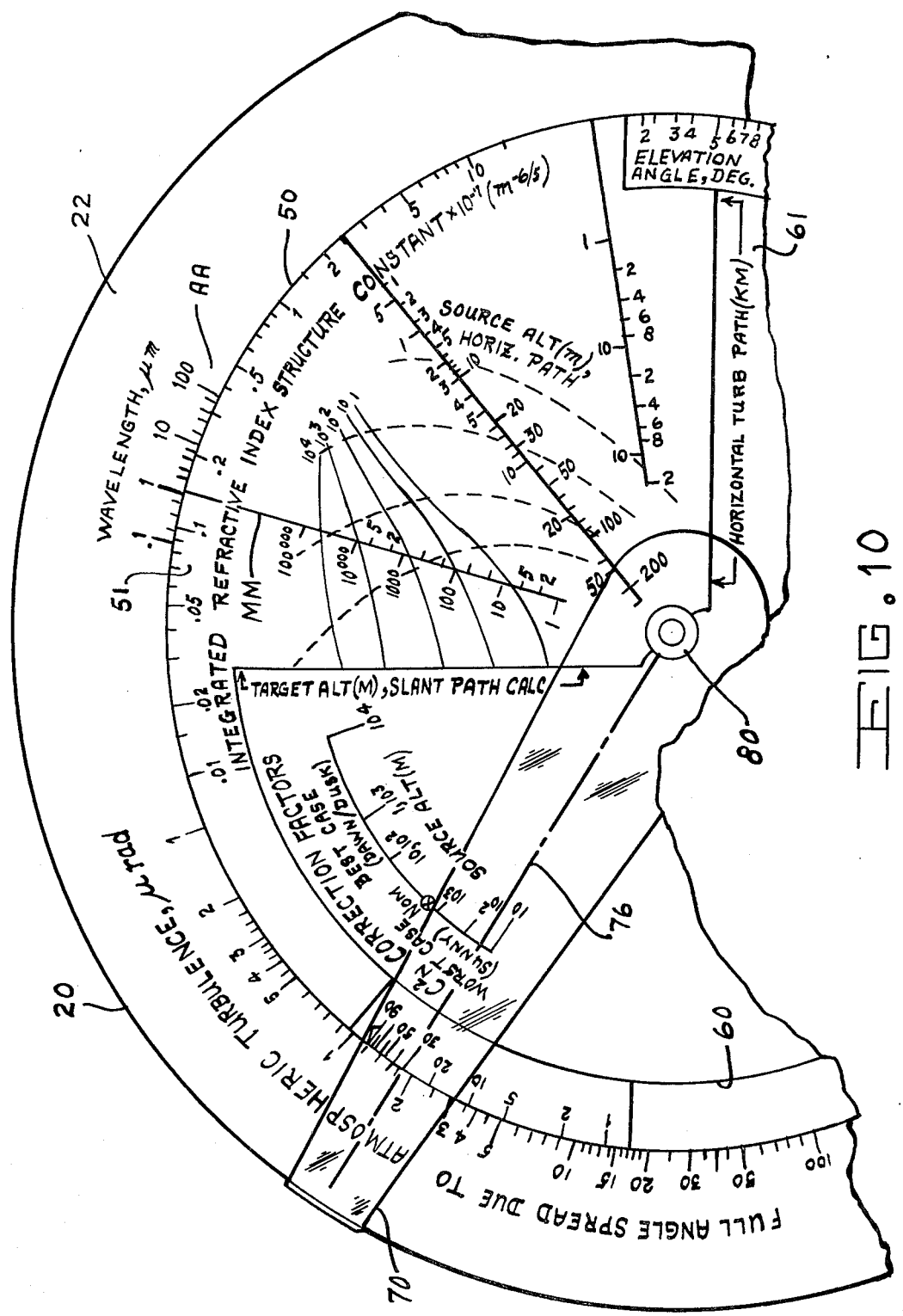

2. Solution: With reference to FIG. 10, therein is shown, in top plan view and in partially fragmented form, a pertinent portion of the preferred embodiment 10 of my inventive computer, with the components thereof in proper positional relationship to solve the above stated beam divergence problem. Shown in FIG. 9 is rear face 22 of stator 20, front face 51 of third rotor 50, front face 61 of fourth rotor 60, cursor 70 with radially disposed hairline 76 marked thereon, and removable, centrally located connecting pivot 80.

Concisely, the preferred sequential steps in solving this problem are as follows. Firstly, move the fourth rotor 60, so that the extended hairline of scale MM is over the $\lambda$ of scale AA on the rear face 22 of stator 20. Secondly, keeping fourth rotor 60 and stator 20 fixed, rotate third rotor 50 until the laser transmitter altitude (on curved lines scales EE1 on front face 51 of rotor 50) is positioned directly under the target altitude on scale MM of rotor 60. Thirdly, set the hairline 76 on the cursor 70 over the elevation angle on scale HH (on face 51 of rotor 50). Fourthly, read the full angle spread (i.e., the solution) directly above, on scale BB (on face 22 of stator 20). Scale JJ (on face 61 of rotor 60) is applied to the result to account for off-nominal Cn conditions.

c. Other "Type" Problems and the Respective Manner of Operation of the Preferred Embodiment in Solving Them:

1. Find the Beam Diameter ($D_B$)

Locate $\theta$ in window 31F (front face 31, first rotor 30, FIG. 4). Convert range units from nmi or smi to km with the use of scale H (front face 21, stator 20, FIG. 3A). Set $R_T$ of scale D (front face 31, first rotor 30, FIG. 4) under $\theta$ value. Read beam diameter on scale C (front face 31, first rotor 30, FIG. 4) at index (marker) 24 (front face 21, stator 20, FIG. 3B). Use scale G (front face 21, stator 20, FIG. 3A) to convert to English units.

2. Find Beam Cross Sectional Area ($A_B$)

Set cursor hairline 76 over $D_B$ on scale C (front face 31, first rotor 30, FIG. 4). Read $A_B$ directly above on scale B (front face 31, first rotor 30, FIG. 4).

3. Find Ideal Flux Density ($I_o$)

aa. Method No. 1

Follow the instructions for the illustrative representative problem with regard to finding the beam spread due to diffraction ($O_D$) hereinabove, and "type" problems (1) and (2) above, where $\theta = \theta_D$ in "type" problem, (2) above. Set $A_B$ of scale B (front face 31, first rotor 30, FIG. 4) directly under $P_L$ on scale A (face 21, stator 20, FIGS. 3A and 3B). At appropriate index on scale J (face 31, first rotor 30, FIG. 4) read $2\sigma$, or $1\sigma$ average or peak intensity on scale A (face 21, stator 20, FIGS. 3A and 3B).

bb. Method No. 2

Obtain $\theta_D$ using the illustrative representative problem with regard to finding the beam spread due to diffraction hereinabove. Set cursor hairline 76 over $P_L$ on scale A (face 21, stator 20, FIGS. 3A and 3B). After converting to km units, set $R_T$ of scale D (front face 31, first rotor 30, FIG. 4) under cursor hairline. Read intermediate result on scale A at 33C. Re-position cursor hairline 76 over this value. Follow the same procedure with $\theta_D$, using scale E (front face 31, front rotor 30, FIG. 4) to obtain result on scale A at appropriate index on scale J in units of watts/m². Scale (extension) A1 (front fact 21, stator 20, FIGS. 3A and 3B) is provided for very low power levels or intensity values. Scale A1 is viewed through window (or notch) 31A (front face 31, first rotor 30, FIG. 4).

4. Find Average Incident Intensity (I)

Using the instructions in the illustrative representative problem with regard to findng the beam spread due to diffraction hereinabove, find $\theta_D$. Now find $\theta_D^2$, using line indicator 34A (front face 31, first rotor 30, FIG. 4). Then, add $\theta_J^2$ and $\theta_T^2$, and finally use line indicator 34A (FIG. 4) again to obtain the square root of this value. This is $\theta$. Now, follow the procedure outlined in (3), above, using $\theta$ in place of $\theta_D$.

5. Find Effect of Correction Factors on Average Intensity

Set computed I of scale A (front face 21, stator 20, FIGS. 3A and 3B) and index mark of scale F (front face 31, first rotor 30, FIG. 4) under cursor hairline 76.

Holding stator 20 and first rotor 30 fixed, move cursor hairline 76 over transmission factor on scale F (FIG. 4). Read degraded I on scale A (FIGS. 3A and 3B). Repeat this procedure with scale F to find the effects of the optics trasmission factor. Continue the procedure using scale K (front face 31, first rotor 30 FIG. 4) and scale M (front face 31, first rotor 30, FIG. 4) to find the degraded I due to incidence angle and obscuration, respectively.

6. Find Incident Beam Energy Density (E)

Set index (marker) 33C (front face 31, first rotor 30, FIG. 4) at computed intensity (watts/m$^2$) on scale A (front face 21, stator 20, FIGS. 3A and 3B). Read beam energy in joules/m$^2$ on scale A at the desired irradiation time on scale B (front face 31, first rotor 30, FIG. 4).

7. Find Total Absorbed Energy ($E_{ab}$)

Set index (marker) 33C (front face 31, first rotor 30, FIG. 4) at computed incident energy (see (6)., above) on scale A (front face 21, stator 20, FIGS. 3A and 3B). Read total beam energy on target on scale A at target area on scale B (front face 31, first rotor 30, FIG. 4). Re-set index (marker) 33C at this value on scale A. Read total absorbed energy on scale A at value of $(1-\rho)$ on scale B.

8. Find Power Received by Antenna in Focal Plane ($P_r$)

Set index (marker) 33C (front face 31, first rotor 30, FIG. 4) at computed incident intensity (watts/m$^2$) on scale A (front face 21, stator 20, FIGS. 3A and 3B). Set cursor hairline 76 over antenna diameter on scale C (front face 31, first rotor 30, FIG. 4) or corresponding antenna area on scale B (front face 31, first rotor 30, FIG. 4). Read total power (watts) collected by antenna directly above on scale A.

9. Find Beam Intensity Degradation Due to Jitter ($I/I_o$)

Locate $\theta_D$ in window 31C (front face 31, first rotor 30, FIG. 4). Set $\theta_j V$ or $\theta_t$ on scale Q (front face 31, first rotor 30, FIG. 4) over $\theta_D$ in window 31C. Find the square of the angle ratio, $\theta_R^2$ on scale U (front face 21, stator 20, FIG. 38) at the appropriate index, 34C (window 31B, front face 31, rotor 30, FIG. 4). Now, add the value 1 to the computed $\theta_R^2$ value. Using 34D, read $I/I_o$ on scale T directly under the 1 $\theta_R^2$ value on scale U (front face 21, stator 20, FIGS. 3A and 3B).

10. Find Decible Gain or Loss (db)

Set "zero" index (marker) 33B (front face 31, first rotor 30, FIG. 4) at $I_1$ on scale A (front face 21, stator 20, FIGS. 3A and 3B). Now, read db gain or loss on scale L (front face 31, first rotor, FIG. 4) at $I_2$ of scale A.

11. find Rayleigh Range ($R_{RR}$)

Locate scale W (front face 21, stator 29, FIGS. 3A and 3B) in window 31D (front face 31, first rotor 30, FIG. 4). Set aperture diameter of scale 01 (front face 31, first rotor 30, FIG. 4) under $\lambda$ on scale W. Read $R_{RR}$ in window 31E (front face 31, first rotor 30, FIG. 4) at index 34B.

12. Find Power Received by a Laser Designator Sensor ($P_s$)

aa. Flood Illumination Case

Follow the instructions in (4), above, and find the incident intensity in watts/m$^2$. Use scale F (front face 31, first rotor 30, FIG. 4) to apply correction factors for $T_{at}$, $T_{ar}$, $T_{to}$, $T_{ro}$, according to the instruction in (5), above. Now, set index (marker) 33C (front face 31, first rotor 30, FIG. 4) at the corrected intensity value. Set cursor hairline 76 over $D_T$ on scale C (front face 31, first rotor 30, FIG. 4). Read intermediate result under hairline 76 of cursor 70 on scale A (front face 21, stator 20, FIGS. 3A and 3B). Repeat the procedure with $A_R$ on scale B (front face 31, first rotor 30, FIG. 4). Again using the cursor hairline 76, set the return path range to receiver sensor $R_R$ on scale D (front face 31, first rotor 30, FIG. 4) under the last computed intermediate result on scale A. Now, find received signal power in watts on scale A at index (marker) 33A (front face 31, first rotor 30, FIG. 4).

bb. Spot Illumination Case

Align $P_L$ (on scale A) and the range from the target to the sensor, $R_R$, (on scale D) with the cursor hairline 76. Find the intermediate result on scale A at the index (marker) 33A. Apply correction factors for $\rho$, $T_{at}$, $T_{ar}$, $T_{to}$ and $T_{ro}$ in accordance with the instructions in (5), above. Apply corrections for $i_a$ and $K_{OB}$, using scale K (front face 31, first rotor 30, FIG. 4) and scale M (front face 31, first rotor 30, FIG. 4), respectively. Set the index (marker) 33C at the intermediate result. Reading directly above $A_R$ value (on scale B), find the received signal power in watts on scale A.

13. Power Received by Laser Radar Sensor ($P_S$)

aa. Repeat the operation set forth in (12) aa, above, substituting $T_{at}$ for $T_{ar}$, and $R_T$ for $R_R$.

bb. Repeat the operation set forth in (12) bb, above, substituting $T_{at}$ for $T_{ar}$, and $R_T$ for $R_R$.

14. Find Beam Divergence From Atmosphere Turbulence ($\theta_T$)

aa. Slant Transmission Path

The procedure to be followed in solving this "type" problem has already been discussed in b. (1) and (2), above.

bb. Horizontal Transmission Path

Position extended hairline of scale OO (front face 61, fourth rotor 60, FIG. 8) over $\lambda$ on scale AA (rear face 22, stator 20, FIGS. 5A and 5B). Keeping fourth rotor 60 and stator 20 fixed, rotate third rotor 50 FIG. 7 until laser transmitter altitude on curved lined scale EE2 (front face 51, third rotor 50, FIG. 7) is directly under target range on scale OO. Now, continue as described in b. (1) and (2), above and read $\theta_T$ at 90° index of scale HH (front face 51, third rotor 50, FIG. 7).

15. Find Atmospheric Transmission Factor ($T_a$)

aa. Integral Approximation Method

Rotate fourth rotor 60, FIG. 8, untl window or transparent sector 63 thereon is approximately over scale II (rear face 22, stator 20, FIGS. 5A and 5B). Holding fourth rotor 60 and stator 20 fixed, rotate third 50, FIG. 7, until viewing window or transparent sector 53 thereon is also over scale II.

Second rotor 40, FIG. 6, contains several sets or grouping of graphs or curves of extinction coefficients for various wavelengths. It is here to be noted, and to be remembered that these sets or groups of curves were constructed or "plotted" based upon data presented in the previously-stated works by Peckham (i.e., "A Simplified Propagation Model for Laser System Studies") and by McClatchey (i.e., "Optical Properties of the Atmosphere", 3rd Edition). By using the removable pivot 80, FIG. 2, this second rotor 40 can be replaced, if desired, with other rotors containing new data or more data on other wavelengths.

To begin the atmospheric transmission calculations, select the wavelength of interest and align the reference marks on second rotor 40 with their values on scale GG (third rotor 50, FIG. 7). The graph and its associated extinction coefficient scale are now properly positioned. Now, divide the difference in altitudes between the transmitter and target into $n$ increments. Beginning with $h_s$ (see FIG. 1) and containing in equal altitude increments up to $h_t$, set each altitude on scale NN (front face 61, fourth rotor 60, FIG. 8) over the graph or curves (i.e., the plurality of FF scales, second rotor 40, FIG. 6) and read the corresponding extinction coefficient above on scale GG (third rotor 50, FIG. 7). The average extinction coefficient ($\alpha$ave) is $$\frac{1}{n} \left( \frac{\alpha_n + \alpha_s}{2} + \alpha_1 + \alpha_2 + \ldots + \alpha_{n-1} \right).$$

Set the extended hairline of scale NN (fourth rotor 60, FIG. 8) over the target range on scale II (stator 20, FIGS. 5a and 5b). Rotate second rotor 40, FIG. 6, and third rotor 50, FIG. 7, together until $\alpha$ave of scale GG (third rotor 50, FIG. 7) is under the hairline of scale NN (fourth rotor 60, FIG. 8). Now, read the atmospheric transmittance on scale LL (stator 20, FIGS. 5A and 5B) at the desired elevation angle on scale DD (third rotor 50, FIG. 7). For co-altitude applications use the 90° index. Note that the scale KK (fourth rotor 60, FIG. 8) can be used with scale II (FIG. 5A) for converting English units to metric units.

bb. Average Altitude Method

This method is similar to the integral approximation method, with the exception that transmittances are calculated for each incremental distance and then multiplied to obtain the overall transmission factor. Divide the difference between transmitter and target altitudes into $n$ increments. Starting mid-way between $h_s$ and $h_s + \Delta h$, find the transmittance, $T_{ai}$, for propagation path $\Delta r$ following the procedures outlined in (15) aa., above. Record the value of $T_{ai}$. Continue this procedure at successive altitude increments up to and including the target altitude. To determine the overall atmospheric transmittance, form the product of the $T_{ai}$'s using scale A (front face 21, stator 20, FIGS. 3A and 3B) and scale B (front face 31, first rotor 30, FIG. 4).

16. Find Differential Altitude Corresponding to Slant Path

Set elevation angle on scale DD (third rotor 50, FIG. 7) under slant path range on scale II (rear face 22, stator 20, FIG. 5A). Read altitude difference on scale II at 90° index (i.e. graduation).

17. Common Conventional Mathematical Operations aa. Multiplication ($x \cdot y$)

Use scale A (front face 21, stator 20, FIGS. 3A and 3B) and scale B (first rotor 30, FIG. 4).

bb. Logarithim ($\log_{10} x$)

Use scale A and scale L (first rotor 30, FIG. 4).

cc. Inverse, i.e., Receiprocal (1/X)

Use scale D (first rotor 30, FIG. 4) and scale R (front face 21, stator 20, FIGS. 3A and 3B).

dd. Squaring ($x^2$)

Use scale R (front face 21, stator 20, FIGS. 3A and 3B) and scale R1 (front face 21, stator 20, FIGS. 3A and 3B), or use scale A and scale E (first rotor 40, FIG. 4).

ee. Trigonometric ($x \sin \theta$)

Use scale II (rear face 22, stator 20, FIG. 5A) and scale DD (third rotor 50, FIG. 7).

ff. Trigonometric ($x \cos \theta$)

Use scale A and scale K (first rotor, FIG. 4).

SUMMARY

In summary, then, the reader can readily see from the Figures of the drawings that:

1. The front face 21 of circular stator 20, FIGS. 3A and 3B is opaque and has on it 11 different scales (i.e., A, A1, U,T,G,R1,X,H,R,V and W), with all scales exept two (i.e., scales G and H) being logarithmic, and with all scales having graduations in units for the intended purpose (e.g. lengths, areas, power, and the like). The specific use of each scale has hereinbefore been shown and/or described.

2. The rear face 22 of circular stator 20, FIGS. 5A and 5B, is also opaque and has on it 4 different scales (i.e., AA, BB, LL, and II), with all scales being logarithmic, and with all scales having graduations in units for the respective purpose intended (e.g., length, including wavelength). The specific use of each of these scales has heretofore also been shown and/or described.

3. The front face 31 of first rotor slide disc 30, FIG. 4, is opaque except for five slots or windows (i.e., 31B–31F, inclusive) and a notch 31A. The specific use of each of these slots (or windows) and the notch already has been shown and/or described hereinbefore. The face 31 has on it 14 different scales (i.e., B,L,J,F,C,Q,D,K,N,M,O,E,O1, and P), with all scales being except L and J, logarithmic, and with all scales being arcuate except for scale J which is graph-like, and with all scales having graduations in units for respective purpose intended (e.g., lengths, areas, time, degrees, decibels, and the like). The specific use of each scale already has been shown and/or described herein.

4. The front face 41 of the second rotor slide disc 40, FIG. 6, is opaque with a transparent circumferential section and has on it three different graph-like scales (i.e., FF1, FF2, and FF3), with each scale comprising a different set of a plurality of curve-like lines which represent extinction coefficients for different wavelengths. The specific use of these scales have been previously shown and/or described herein.

5. The front face 51 of the third rotor slide disc 50, FIG. 7, has a transparent sector portion 53 and an opaque sector portion (i.e., the remainder of the face 51 of disc 50). On the transparent sector portion 53 there is one scale GG, and on the opaque sector portion there are 5 scales (i.e., CC, DD, HH, EE1 and EE2). Scales GG, CC, DD and HH are configurated arcuately and are logarithmic. Scales EE1 and EE2 are graph-like, with each scale comprising a different set of a plurality of curve-like lines (5 in EE1, and 4 in EE2) representing, respectively, upward paths and horizontal paths for determining beam divergence from atmospheric turbulence. The specific use of all of the scales on face 51 of third rotor 50 have been shown and/or described herein previously.

6. The front face 61 of fourth rotor slide disc 60, FIG. 8, has a first plurality of scales on the transparent sector portion 63 of face 61, and a second plurality of scales on the opaque sector portion (i.e., the remainder of face 61 of fourth rotor 60) thereof. On the transparent sector portion 63 there are 3 scales (i.e., MM, NN, and OO), each of which is in the form of a radially extending line; each is logarithmic; and, each has graduation in units for the respective purpose intended (e.g., altitude). On the opaque sector there are two scales (JJ and KK), and each has graduation in units for the purposes intended.

CONCLUSION

It is abundantly clear from all of the foregoing, and from the drawings herein, that the desired objects of my inventive hand-holdable, multi-purpose, laser computer, as well as other related objects, have been attained.

Additionally, it is emphasized that, although there have been described and shown the fundamental unique features of my invention, as applied to a preferred embodiment 10, in the structural form of a circular slide rule, various other embodiments, adaptations, and the like will occur to and can be made by those of ordinary skill in the art, without departing from the spirit of my inventive laser computer. For example, complementary indentations may be made on second rotor 40, FIG. 6, and on third rotor 50, FIG. 7, to keep said rotors mechanically "fixed" as an added convenience in appropriate circumstances.

Further, it is reiterated that, with reference to the drawings, and more particularly to FIGS. 3A, 3B, 4, 5A, 5B, 6, 7, 8, 9 and 10 thereof, therein are shown all component members of the preferred circular slide rule embodiment 10 of my inventive laser computer; that all said components are dimensioned and configurated to scale, both as to each other and as to markings thereon (e.g., scales, graphs, curves, index markers, fiduciary lines and the like) and as to the slots, windows, notch, and sectors and the like therein; and, as a result, that the reader (whether or not he be a person of ordinary skill in the art) need only cut out (or reproduce uniformly) the drawings and assemble the respective components in their respective and relative positions (as shown in FIG. 2, and as easily ascertainable from FIGS. 9 and 10) to have a working (i.e., a functional) model or prototype of the preferred embodiment.

Still further, in the interest of assisting the reader, I will identify the scales on the component stator and rotor slide discs of my invention by using reference characters (i.e., assigned alphabetic designations) in my claims whenever I deem such use desirable.

What is claimed is:

1. A multi-purpose, hand-holdable laser computer in the form of a circular slide rule, comprising:
   a. an opaque circular stator having a front face, a rear face, a geometric center, a diameter, and a plurality of different preselected scales suitably disposed in arcuate configuration on said front face and on said rear face at predetermined fixed locations thereon, wherein said plurality of said different preselected scales at predetemined fixed locations on said front face of said circular stator include, from the most radially remote inward toward said geometric center of said stator:
      1. an outermost scale (A) of logarithmic graduations in units for use in calculations involving incident intensity, peak intensity, ideal flux, incident energy fluence, total absorbed energy, received power, received sensor power, laser power, multiplication, logarithms, squaring, and trigonometric functions;
      2. an inner scale (A1) of logarithmic graduations in units for use in calculations involving extended power and intensity;
      3. another inner scale (U) of logarithmic graduations in units for use in calculations involving intensity degradation due to jitter;
      4. still another inner scale (T) of logarithmic graduations in units for use in calculations involving intensity degradation due to jitter;
      5. yet another inner scale (G) with graduations in units for converting inches to centimeters, and feet to meters, and vice versa;
      6. another inner scale (R1) of logarithmic graduations in units for use in calculations involving squaring;
      7. still another inner scale (X) of logarithmic graduations in units for use in calculations involving Rayleigh range;
      8. yet another inner scale (H) with graduation in units for converting nautical miles and statute miles to kilometers and vice versa;
      9. another inner scale (R) of logarithmic graduations in units for use in calculations involving beam spread angle and reciprocals;
      10. an innermost scale (V) of logarithmic graduations in units for use in calculations involving beam spread due to diffraction;
      11. and, another innermost scale (W) of logarithmic graduations in units for use in calculations involving a Rayleigh range;
   b. a first rotor slide disc having a front face, a geometric center, and a diameter smaller than said diameter of said circular stator, with said first rotor slide disc positioned front-face-up on said front face of said circular stator with the respective said geometric centers of said circular stator and of said first rotor slide disc in registration, and with said first rotor slide disc also having on said front face thereof an arcuately configurated notch and a plurality of different arcuately configurated slots, wherein said notch and said slots are suitably disposed on said front face of said first rotor slide disc at predetermined fixed locations thereon, and with said first rotor slide disc further having on said front face thereof a plurality of different preselected scales suitably disposed on said front face at predetermined fixed locations thereon in arcuate configuration, with said notch, said slots, and said scales on said front face of said first rotor slide disc usable complementarily with, and cooperatively with, said scales on said front face of said circular stator;
   c. an opaque second rotor slide disc having a front face, a geometric center, and a diameter smaller than said diameter of said circular stator, with said second rotor slide disc positioned with said front face up on said rear face of said circular stator with the respective said geometric centers of said circular stator and of said second rotor slide disc in registration, and with said second rotor slide disc also having on said front face thereof a plurality of different graph-like preselected scales of sets of curve-like lines suitably disposed on said front face at predetermined fixed locations thereon;
   d. a third rotor slide disc having a front face, with an opaque sector portion and a transparent sector portion, a geometric center, and a diameter smaller than said diameter of said second rotor slide disc, with said third rotor slide disc positioned with said front face up on said front face of said second rotor slide disc with said respective geometric centers of said third rotor slide disc and of said second rotor slide disc in registration, and with said third rotor slide disc also having on said opaque sector portion of said front face thereof a plurality of different preselected scales in arcuate configuration and a plurality of graph-like scales of sets of curved-like lines, and also with said third rotor slide disc having on said transparent sector portion thereof a preselected scale in arcuate configuration, with all said scales on said front face of said third rotor slide disc disposed at predetermined fixed locations thereon;

e. a fourth rotor slide disc having a front face with a transparent sector portion and an opaque sector portion, a geometric center, and a diameter smaller than said diameter of said third rotor slide disc, with said fourth rotor slide disc positioned with said front face up on said front face of said third rotor slide disc with said respective geometric centers of said fourth rotor slide disc and of said third rotor slide disc in registration, and with said front face of said fourth rotor slide disc having on said transparent sector portion thereof a first plurality of different preselected scales marked and disposed at predetermined fixed locations thereon in the form of radially extending lines, and with said front face of said fourth rotor slide disc having on said opaque sector portion thereof a second plurality of different preselected scales disposed at predetermined fixed locations thereon in arcuate configuration;

f. a transparent foldable cursor having two ends with a pivot like hole at and in each end, a top surface with a radially disposed hairline marked thereon, and a bottom surface, and being of a length longer than said diameter of said circular stator, with said cursor folded at half-length and positioned so that said bottom surface of one half-length is on top of and abuts the front face of said fourth rotor slide disc, also positioned so that said bottom surface of said other half-length is on top of and abuts said front face of said first rotor slide disc, and said pivot holes are directionally opposed;

g. and, a removable, centrally located pivot connecting said circular stator, said first rotor slide disc, said second rotor slide disc, said third rotor slide disc, and said fourth rotor slide disc to each other and together at their respective geometric centers, and with said pivot also connecting said cursor to said circular stator and to said rotor slide discs, whereby said cursor and said rotor slide discs are pivotally secured and are independently rotatable about and on said pivot.

2. A multi-purpose hand-holdable laser laser computer, as set forth in claim 1, wherein said plurality of said different preselected scales at predetermined fixed locations on said rear face of said circular stator include:

a. a scale (AA) in logarithmic graduations in appropriate units of wavelength for use in calculations involving wavelength and beam divergence from atmospheric turbulence;

b. a scale (BB) of logarithmic graduations in appropriate units for use in calculations involving turbulence-induced beam angle spread;

c. a scale (LL) of logarithmic graduations in appropriate units for use in calculations involving atmospheric transmittance to a target and atmospheric transmittance along a return path;

d. and, a scale (II) of logarithmic graduations in appropriate units for use in calculations involving target range, atmospheric transmission factor, turbulence induced beam spread differential altitude corresponding to slant path, reciprocals, and trigonometric functions.

3. A multi-purpose, hand-holdable laser computer, as set forth in claim 1, wherein said plurality of said different preselected scales at predetermined fixed locations on said first rotor slide disc include, from the most radially remote inward toward said geometric center of said stator:

a. an outermost scale (B) of logarithmic graduations in units for use in calculations involving irradiation time, beam area, receiver antenna area, target area, sensor receiver area, and multiplication;

b. another outermost scale (L) of linear graduations in units for use in calculations involving decibel gain and loss;

c. an inner scale (J) of graph-like line in graduations and in units for use in calculations involving beam shape factor;

d. another inner scale (F) of logarithmic graduations in units for use in calculations involving atmospheric transmittance to a target, atmospheric transmittance along a return path, target reflectance, transmittance of sensor optics, and multiplication;

e. still another inner scale (C) of logarithmic graduations in units for use in calculations involving beam, antenna and target diameters;

f. yet another inner scale (Q) of logarithmic graduations in units for use in calculations involving spreading terms and beam intensity degradation due to jitter;

g. another inner scale (D) of logarithmic graduations in units for use in calculations involving target range, return range path, and reciprocals;

h. still another inner scale (K) of logarithmic graduations in units of degrees for use in calculations involving beam incidence angle, and trigonometric functions;

i. yet another inner scale (N) of logarithmic graduations in units for use in calculations involving beam quality factor;

j. another inner scale (M) in graduations and in units for use in calculations involving an obscuration factor;

k. still another inner scale (O) of logarithmic graduations and in units for use in calculations involving aperture diameter and beam spread due to diffraction;

l. another inner scale (E) of logarithmic graduations and in units for use in calculations involving total beam divergence angle, receiver field of view, and squaring;

m. another inner scale (O1) of logarithmic graduations and in units for use in calculations involving aperture diameter and beam spread due to diffraction;

n. and, an innermost scale (P) in units for use in calculations involving conversion factors in determining ideal flux density.

4. A multi-purpose, hand-holdable laser computer, as set forth in claim 1, wherein said plurality of said different preselected scales at predetermined fixed locations on said front face of said second rotor slide disc include:

a. a first scale (FF1) comprising a set of a plurality of graph-like and curve-like lines representing extinction coefficients for various wavelengths for use in calculations involving determining an atmospheric transmission factor;

b. a second scale (FF2) comprising another and different set of a plurality of graph-like and curve-like lines representing extinction coefficients for various wavelengths, different from the extinction coefficients represented on said first scale (FF1), for use in calculations involving determining an atmospheric transmission factor;

c. and, a third scale (FF3) comprising still another and different set of a plurality of graph-like and curve-like lines representing extinction coefficients for various wavelengths, different from the extinction coefficients represented on said first scale (FF1) and said second scale (FF2), for use in calculations involving determining an atmospheric transmission factor.

5. A multi-purpose, hand-holdable laser computer, as set forth in claim 1, wherein said plurality of said different preselected scales at predetermined fixed locations on said front face of said third rotor slide disc, include:

a. an outer scale (CC) of logarithmic graduations in units for use in calculations involving a nominal refractive index structure constant;

b. another outer scale (DD) of logarithmic graduations in units of degrees for use in calculations involving elevation angle and trigonometric functions;

c. still another outer scale (GG) of logarithmic graduations in units for use in calculations involving an extinction coefficient, wherein this said scale (GG) is disposed on said transparent sector portion of said front face of said third rotor slide disc;

d. yet another outer scale (HH) of logarithmic graduations in units of degrees for use in calculations involving an elevation angle and beam divergence from atmospheric turbulence;

e. an inner scale (EE1) comprising a set of a plurality of graph-like and curve-like lines representing upward paths for use in calculations involving determining beam divergence from atmospheric turbulence;

f. and, another inner scale (EE2) comprising another and different set of a plurality of graph-like and curve-like lines representing horizontal paths for use in determining beam divergence from atmospheric turbulence.

6. A multi-purpose, hand-holdable laser computer, as set forth in claim 1, wherein said first plurality and said second plurality of said different preselected scales at predetermined fixed locations on said front face of said fourth rotor slide disc, include:

a. in said first plurality of scales disposed on said transparent sector portion of said front face in the form of radially extending lines on said transparent sector portion:

1. a scale (MM) of logarithmic graduations in units representing target altitude for use in calculations involving a slant transmission path as to beam divergence from atmospheric turbulence;

2. another scale (NN) of logarithmic graduation in units representing altitude for use in calculations involving determining an atmospheric transmission factor;

3. and, still another scale (OO) of logarithmic graduations in units representing target altitude in calculations involving a horizontal transmission path as to beam divergence from atmospheric turbulence;

b. and, in said second plurality of scales disposed on said opaque sector portion of said front face:

1. a scale (JJ) of appropriate graduations in units for use in calculations involving correction factors with regard to source altitude as to beam divergence from atmospheric turbulence;

2. and, another scale (KK) of logarithmic graduations in units for use in calculations involving distance correction, and also for converting English units to metric units.

7. A multi-purpose, hand-holdable laser computer, as set forth in claim 1, wherein:

a. said plurality of different arcuate configured slots on and in said front face of said first rotor slide disc include, from the most radially remote inward toward said geometric center of said first rotor slide disc:

1. an outermost slot, having two angularly spaced fiduciary markers, for use in calculations involving determining beam intensity degradation due to jitter;

2. an inner slot, with a fiduciary marker, for use in calculations involving target range, beam divergence angle, and beam, antenna, and target diameter;

3. another inner slot, with a fiduciary marker, for use in calculations involving a Rayleigh range and a near field and a far field thereof;

4. still another inner slot for use in calculations involving diffraction beam spread, non-diffraction beam spread, beam quality, and beam intensity degradation due to jitter;

5. and, an innermost slot for use in calculations involving beam spread due to diffraction, a wavelength, and aperture diameter;

b. and, said arcuate configured notch on and in said front face of said first rotor slide disc is most remotely radially located from said geometric center of said first rotor slide disc than said outermost slot, with said notch for use in calculations involving extended power.

* * * * *